(12) United States Patent
Savvides et al.

(10) Patent No.: US 12,731,406 B2
(45) Date of Patent: Sep. 8, 2026

(54) SYSTEM AND METHOD FOR THE AUTOMATIC DETECTION OF OPENLY-CARRIED FIREARMS

(71) Applicant: CARNEGIE MELLON UNIVERSITY, Pittsburgh, PA (US)

(72) Inventors: Marios Savvides, Pittsburgh, PA (US); Chenchen Zhu, Pittsburgh, PA (US); Nnamdi Adom, Pittsburgh, PA (US)

(73) Assignee: CARNEGIE MELLON UNIVERSITY, Pittsburgh, PA (US)

( * ) Notice: Subject to any disclaimer, the term of this patent is extended or adjusted under 35 U.S.C. 154(b) by 71 days.

(21) Appl. No.: 18/576,198

(22) PCT Filed: Aug. 16, 2022

(86) PCT No.: PCT/US2022/040395
§ 371 (c)(1),
(2) Date: Jan. 3, 2024

(87) PCT Pub. No.: WO2023/023008
PCT Pub. Date: Feb. 23, 2023

(65) Prior Publication Data

US 2024/0320980 A1 Sep. 26, 2024

Related U.S. Application Data

(60) Provisional application No. 63/235,239, filed on Aug. 20, 2021.

(51) Int. Cl.
*G06V 20/52* (2022.01)
*G06V 10/82* (2022.01)
*G08B 21/02* (2006.01)

(52) U.S. Cl.
CPC .............. *G06V 20/53* (2022.01); *G06V 10/82* (2022.01); *G08B 21/02* (2013.01); *G06V 2201/07* (2022.01)

(58) Field of Classification Search
CPC .... G06V 20/53; G06V 10/82; G06V 2201/07; G08B 21/02
See application file for complete search history.

(56) References Cited

U.S. PATENT DOCUMENTS 5,689,184 A * 11/1997 Jeffers .................... G01V 3/104 340/572.1
6,366,203 B1 * 4/2002 Burns ...................... G01V 3/00 340/572.1

(Continued)

FOREIGN PATENT DOCUMENTS

CN 113678139 A * 11/2021 ......... H04N 23/6812
JP 2000020857 A * 7/1998

OTHER PUBLICATIONS

Millican, R N CN 113678139 A Feb. 14, 2020 (Year: 2020).*

(Continued)

*Primary Examiner* — Zaihan Jiang
(74) *Attorney, Agent, or Firm* — KDW FIRM PLLC

(57) ABSTRACT

Disclosed herein is a system and method for the automatic detection of persons engaged in the open carry of firearms at a venue. The system and method comprise strategically placed cameras at the venue which are connected to edge devices which extract frames from video generated by the cameras. The video frames are sent to a server for analysis by an AI/ML model trained to detect firearms and, specifically, to detect persons carrying firearms. If a person wielding a firearm is detected in any image, an alert is raised and local authorities are automatically contacted. The system is designed to run continuously such as to be able to quickly detect a person in a venue carrying a firearm.

9 Claims, 3 Drawing Sheets

(56) References Cited

U.S. PATENT DOCUMENTS

| | | | | |
|---|---|---|---|---|
| 9,996,890 | B1 * | 6/2018 | Cinnamon | G06V 10/764 |
| 2014/0218518 | A1 * | 8/2014 | Oliver | G08B 13/1672 348/143 |
| 2015/0194033 | A1 * | 7/2015 | Esposito | G08B 21/02 340/686.6 |
| 2015/0204109 | A1 * | 7/2015 | Ergenbright | G05B 13/00 340/541 |
| 2016/0358393 | A1 | 12/2016 | Penland | |
| 2018/0122030 | A1 * | 5/2018 | Raz | G06Q 50/265 |
| 2018/0156577 | A1 * | 6/2018 | Navin | F41H 5/06 |
| 2019/0088106 | A1 * | 3/2019 | Grundstrom | H04W 4/90 |
| 2019/0101687 | A1 * | 4/2019 | Rosen | G02B 5/0226 |
| 2020/0117900 | A1 * | 4/2020 | Deng | H04L 67/12 |
| 2020/0226892 | A1 * | 7/2020 | Coles | G08B 5/38 |
| 2020/0401814 | A1 * | 12/2020 | Salguero | H04N 23/54 |
| 2021/0374405 | A1 * | 12/2021 | Salguero | G06V 20/10 |

OTHER PUBLICATIONS

Taiichi Jinno JP2000020857A Jul. 6, 1998 (Year: 1998).*

International Search Report and Written Opinion for Application No. PCT/US2022/40395 dated Jan. 9, 2023.

* cited by examiner

SYSTEM AND METHOD FOR THE AUTOMATIC DETECTION OF OPENLY-CARRIED FIREARMS

RELATED APPLICATIONS

This application is a national phase filing under 35 U.S.C. § 371 claiming the benefit of and priority to International Patent Application No. PCT/US2022/040395, filed Aug. 16, 2022, entitled "System and Method for the Automatic Detection of Openly-Carried Firearms", which claims the benefit of U.S. Provisional Patent Application No. 63/235,239, filed Aug. 20, 2021, the contents of which are incorporated herein in their entirety.

BACKGROUND

There has been a rising trend of mass shootings and active shooter incidents in the past decade, especially in the United States. Any venue where crowds of people congregate is a potential target for a mass shooter. These targets include, for example, classrooms, theaters, restaurants, stadia, etc. Mass shootings are defined as incidents wherein four or more people, not including the shooter, are injured or killed. In 2022, the United States has averaged more than one mass shooting per day. In a recent poll, 6 of 10 Americans live in fear of a mass shooting incident in their community.

There is currently no effective way to prevent such mass shootings or to mitigate the damage caused by these deranged individuals. Recent advancements in object detection driven by machine learning technologies have improved the understanding of vulnerable venues to better address mass shootings (or other dangerous circumstances) and to mitigate the number of victims. However, a need still exists to provide improvements in object detection to augment existing security systems, which often include closed-circuit video sources, to better understand the environment and detect potential shooters before mass casualties occur.

SUMMARY OF THE INVENTION

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

The invention disclosed herein includes a system that addresses object detection to better help in the understanding of vulnerable environments. The system comprises a real-time detection system for hand-held firearms, primarily meant for schools, but also applicable to many other venues. The system comprises three parts: (1) image gathering; (2) AI/ML (artificial intelligence/machine learning) analysis, and (3) reporting. In one embodiment, one or more edge devices are used to gather images from various locations in the school. The gathered images are sent to a central server for processing with an AI-based firearm detection model. If a firearm is detected the server will raise an alert to the appropriate authorities.

BRIEF DESCRIPTION OF THE DRAWINGS

In the drawings, like reference characters generally refer to the same parts throughout the different views. In the following description, various embodiments of the present invention are described with reference to the following drawings, in which.

DETAILED DESCRIPTION

Figure 1:
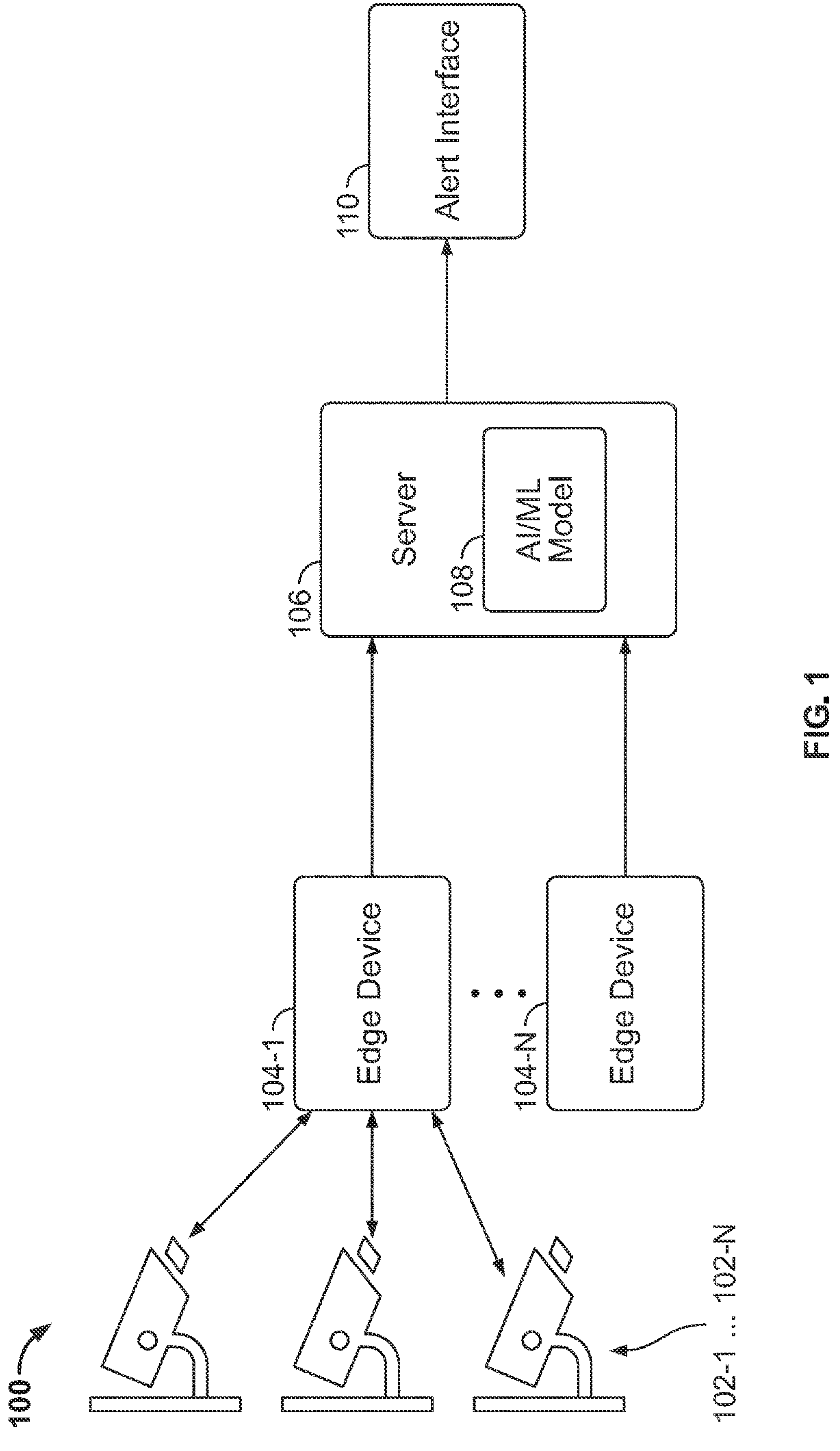
FIG. 1 is a block diagram of the system.

The invention is described herein in terms of a system designed for use in a school venue. However, as would be realized, the system may be used in any venue vulnerable to a mass shooting incident.

In one aspect of the invention, disclosed herein is a system for the automatic detection of handheld firearms in or near a venue. In some embodiments, the disclosed invention includes a system comprised of three parts: image gathering, AI analysis, and reporting. A second aspect of the invention comprises a method that may be implemented by the described system or by another system.

The components of the system 100 of the present invention will be explained with reference to FIG. 1. To gather the images to be used as input to and analyzed by the AI/ML model 108, one or more image sensing devices 102-1 . . . 102-N, for example, still or video cameras, are strategically deployed around the venue. The cameras 102-1 . . . 102-N may be any type of sensor capable of collecting video or still images, for example, closed-circuit TV (CCTV) cameras, webcams, IP enabled cameras, etc. The cameras 102-1 . . . 102-N should be deployed within the venue such as to capture images from the largest possible areas such as to provide the greatest possible coverage of the venue. For example, in a classroom, a camera 102 may be mounted up high in a corner opposite the entry doorway or, in a hallway, at the end of the hallway. Cameras 102 may be mounted both inside the venue and outside of the venue, such as to provide the system 100 with the ability to detect potential shooters as they approach the venue.

The cameras 102-1 . . . 102-N may be connected via a wired or wireless connection to an edge device 104. The edge device 104 is responsible for obtaining still images or individual frames from video from the cameras. In some embodiments, one or more cameras may be connected to a single edge device 104 via a wired or wireless connection. In some embodiments, multiple edge devices 104-1 . . . 104-N may be used, with each edge device 104 connected to one or more cameras 102. In yet other embodiments, the cameras may be connected directly to the server (not shown) via a wired or wireless connection.

The edge devices 104-1 . . . 104-N may be simple computing devices, for example, Raspberry Pi or Arduino devices, or any processor coupled with memory capable of executing software stored in the memory. In the event that one or more video cameras are used, the software executed by an edge device 104 is responsible for grabbing frames from video received from cameras 102-1 . . . 102-N and transmitting the frames to server 106. In some embodiments, video may be constantly received from a camera 102 and the software executed on edge device 104 may grab a frame from the video periodically or after predetermined number frames. For example, edge device 104 could extract a frame from a video feed once per second or every 30 frames. In alternate embodiments, wherein a non-video camera is used, images may be received by edge device 104 periodically, for example, once per second. A camera 102 may be under the control of the software executed on edge device 104 wherein, for example, the edge device 104 can instruct a non-video camera 102 to transmit a single image.

Images or frames collected by edge devices 104-1 . . . 104-N are transmitted to server 106. Edge devices 104-1 . . . 104-N may be connected to server 106 via a wired or wireless connection, for example, via Wi-Fi or Bluetooth. In some embodiments, an edge device 104 may provide preliminary analysis of the image to determine if a person is in the scene and, if so, may transmit the image to server 106 and otherwise may discard the image. Images showing an aerial view, or a large area of the venue may be chopped into sections and each section analyzed by the edge device 104 to determine whether to send the overall image to server 106. In some embodiments, edge devices 104-1 . . . 104-N may be provided with a simple object detection model to determine whether the images show a person within the scene depicted in the image.

Once received by server 106, the images are parallelly evaluated by AI/ML model 108. If a firearm is discovered in any image, AI/ML model 108 may place a bounding box around the firearm in the original image. In practice and in various embodiments, any AI or ML model properly-trained to detect firearms, and in particular, firearms being held by a person, can be used. Some examples of AI/ML architectures suitable for the task include RetinaNet, FSAF, YOLO, Faster R-CNN and SSD. Preferably, the AI/ML architecture chosen is specifically designed for an object detection task and includes a binary classifier to provide am affirmative or negative conclusion as to the presence of a firearm in a particular image.

Figure 2:
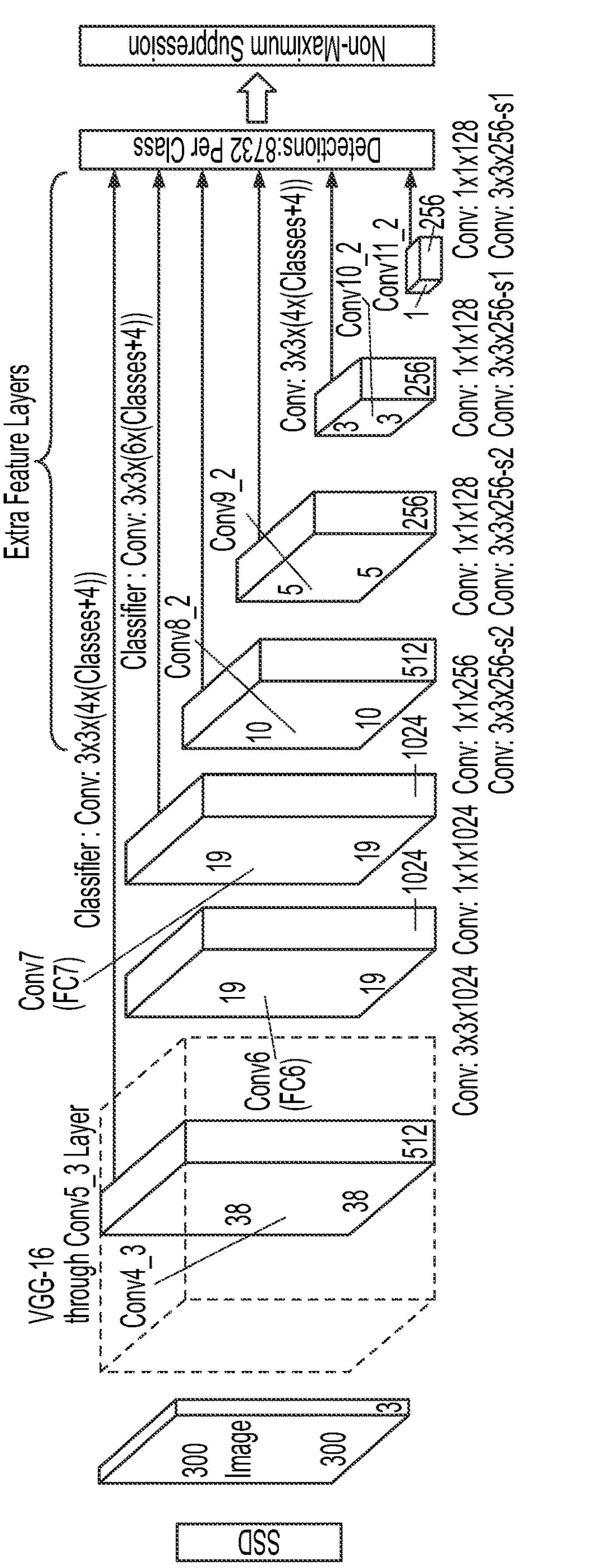
FIG. 2 is a block diagram of the AI/ML object detector.

In one embodiment, a modified version of the SSD (single shot detector) model may be used, as shown in block diagram form in FIG. 2. The SSD model is based on a feed-forward convolutional network that produces a fixed-sized collection of bounding boxes and scores for the presence of the object class instances (i.e., firearms) in those boxes, followed by a non-maximum suppression step two produce the final detections. The SSD model has the advantage of being able to detect specific objects from different feature maps of different scales and may use separate predictors for different aspect ratios. In one embodiment using the SSD model, the weights of the SSD model were initialized with ImageNet. Training then proceeded using a batch size of 64, a learning rate of $1\times10^{-5}$ and 120,000 iterations.

During training, the SSD model needs only an input image and ground truth boxes for each object. In one embodiment, the SSD model was trained on the Soft Computing and Intelligent Information Systems weapons dataset (SCI2S), which comprises two classes with rich context: a firearm class and a hand class. Firearm images always contained a handheld or non-handheld firearm, while the hand images show hands holding items or idle hands. Most of the hand class images come from hand instances in the Visual Object Classification dataset, scenes from Buffy the Vampire Slayer movie, Poselet, and Inria. Most of the firearm class images come from Internet Movie Firearms Database (IMFD) and the remaining SCI2S consist of handheld firearm images with various backgrounds ranging, for example, from CCTV footage to cartoons. The SCI2S dataset contains 6900 images with rich context: 3900 hand images and 3000 firearm images.

Even though the hand class has rich context, none of the background were of CCTV scenery. Also, the non-handheld firearm images accounted for more than 40% of the firearm class images. Thus, the CCTV footage is under represented. The dataset contains less than 500 CCTV images. As such, the CCTV footage instances need to be augmented by using background to generate multiple instances of hand images in the foreground, using known techniques for data augmentation.

AI/ML model 108 preferably includes a binary classifier to provide yes or no decision as to whether a particular image shows a firearm. If a firearm is detected, a signal is sent to alert interface 110 which may take one of several actions. In one embodiment, am automatic report can be made to local authorities. The report may, in some embodiments, consist of an audible call to a 911 operator to report an active shooter at the venue. Alternatively, or in addition to the 911 call, an email may be sent to the local authorities having an attachment comprising the image showing the firearm, and having a bounding box drawn around the firearm. In some embodiments, an alarm may be raised at the venue in lieu of or in addition to the report to local authorities. For example, in a school setting, an announcement could be made that an active shooter is on location which may allow teachers in the classroom to lock down the classrooms and, if properly trained, teachers may prepare to defend the classrooms with personal firearms. If the potential shooter is detected outside of the venue, the venue may be locked down to prevent entry. In certain embodiments, video from cameras 102-1 . . . 102-N may be constantly recorded on server 106, or, alternatively, recordings may commence once AI/ML model 108 has detected a firearm to document the incident.

Figure 3:
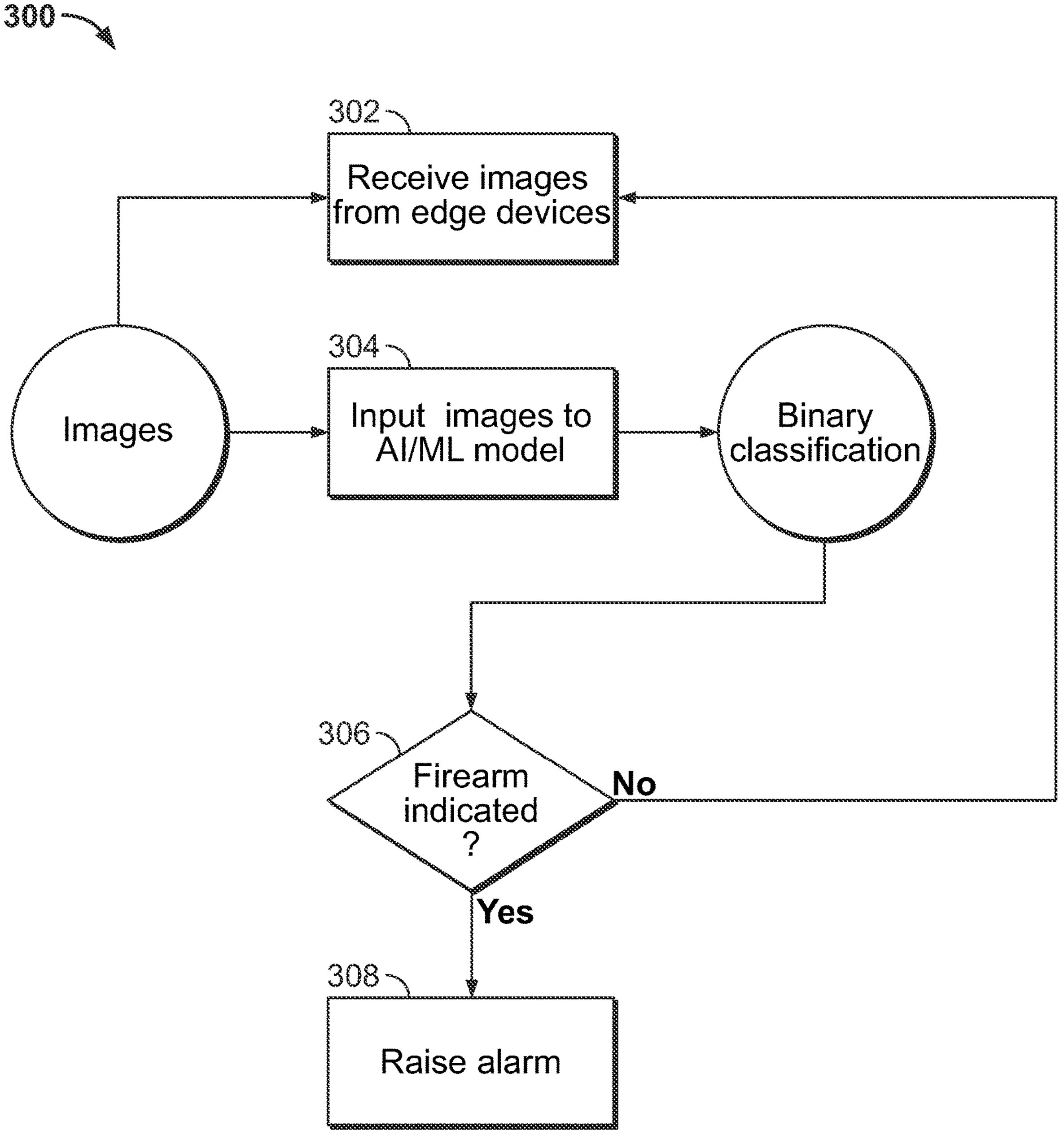
FIG. 3 is a flowchart showing the method of the invention.

FIG. 3 is a flowchart showing a method 300 for implementing the disclosed invention. Method 300 may be implemented by software executing on server 106. Server 106 may comprise a processor and memory, storing the software for execution by the processor, wherein the software implements method 300. At step 302 of method 300, images are received from edge devices 104-1 . . . 104-N. As previously stated, the images may be frames grabbed by an edge device 104 from video captured by cameras 102-1 . . . 102-N at a predetermined frame interval. For example, one of every 30 frames may be captured and sent to server 106. Alternatively, the images may be images captured directly from non-video cameras 102 at predetermined time intervals, for example, one image per second. At step 304 of method 300, the images are input to the AI/ML model 108 for analysis. AI/ML model 108 produces a binary classification output indicating the presence or non-presence of a firearm in an input image. Additionally, in the event that AI/ML model 108 detects a firearm within an input image, the input image may be augmented with a bounding box containing the firearm.

At decision point 306 of method 300, it is determined if a firearm is indicated by the binary classification produced by AI/ML model 108 in step 304. If no firearm is indicated, control returns to step 302 of method 300, where the next set of images is received from edge devices 104-1 . . . 104-N. As long as no firearm is indicated in step 306, steps 302, 304 and 306 of method 300 are iterated in a non-ending loop. If, at decision point 306, the presence of a firearm is indicated, control proceeds to step 308, where an alert or alarm is raised in a manner as previously described.

As would be realized by one of skill in the art, the disclosed method 300 described herein can be implemented by system 100 of FIG. 1, or by any alternate system capable of supporting the functions of method 300. It should be noted that the training and testing of AI/ML model 108 can be performed by software executing on a processor which is not necessarily a part of system 100.

Further, the invention has been described in the context of specific embodiments, which are intended only as exemplars of the invention. As would be realized, many variations of the described embodiments are possible. The invention is not meant to be limited to the particular exemplary configuration disclosed herein. Moreover, it is to be understood that the features of the various embodiments described herein were not mutually exclusive and can exist in various combinations and permutations, even if such combinations or permutations were not made express herein, without departing from the spirit and scope of the invention. For example, although FIG. 1 depicts the server 106 and alert interface 110 as separate components, these components could, in some embodiments, easily be combined. Accordingly, the method and apparatus disclosed herein are not to be taken as limitations on the invention but as an illustration thereof. For example, as would be realized by one of skill in the art, system 100 and/or method 300 may be designed and deployed for any specific venue. The specific venue may drive, for example, the number of cameras 102 (and the placement thereof) and/or the number of edge devices 104 comprising system 100, and their configuration. As a further example, as discussed herein, any AI/ML architecture capable of being trained for the object detection and classification purposes of the invention may be used in lieu of the SSD model of the preferred embodiment. All such variations are contemplated to be within the scope of the invention, which is defined by the following claims.

The invention claimed is:

1. A system for automatically detecting handheld firearms at a venue comprising:

a server executing an object detection model trained to detect handheld firearms in one or more images of a venue and to provide a binary classification indicating the presence or non-presence of a firearm in the images;

one or more edge devices located remotely from and in communication with the server; and one or more image sensing devices connected to each of the one or more edge devices;

wherein each of the one or more edge devices periodically extracts still images from video provided by the one or more image sensing devices or periodically instructs the one or more image sensing devices to provide a still image;

wherein each of the one or more edge devices periodically sends the still images to the server for submission to the object detector; and wherein the server receives the one or more still images from the one or more edge devices and inputs the received images to the object detection model.

2. The system of claim 1 further comprising:

an alert interface.

3. The system of claim 2 wherein the server determines that the binary classification indicates the presence of a firearm in at least one of the one or more images and signals the alert interface to raise an alert.

4. The system of claim 3 wherein raising an alert includes one or more of automatically contacting local authorities and sounding an alarm at the venue.

5. The system of claim 1 wherein the one or more images are received from one or more edge devices via a wired or wireless connection.

6. The system of claim 1 wherein the one or more edge devices perform the further functions of:

determining if the one or more images derived from the still images or video contain one or more people; and sending an image to the server only if one or more people are detected in the image.

7. The system of claim 1 wherein the object detection model is a single shot detector.

8. The system of claim 1 wherein the one or more image sensing devices include one or more still image cameras, one or more video cameras, or a combination of still image cameras and video cameras.

9. The system of claim 1 wherein the object detection module comprises an object detector trained to produce bounding boxes and scores for possible firearms in the received images and a classifier taking as input the bounding boxes and scores and providing a binary classification as to the presence of a firearm.

* * * * *